United States Patent
Yu et al.

(10) Patent No.: US 9,523,883 B2
(45) Date of Patent: Dec. 20, 2016

(54) LED UNIT AND DISPLAY INCOPORATING THE SAME

(71) Applicant: HON HAI PRECISION INDUSTRY CO., LTD., New Taipei (TW)

(72) Inventors: Tai-Cherng Yu, New Taipei (TW); I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 601 days.

(21) Appl. No.: 13/749,575

(22) Filed: Jan. 24, 2013

(65) Prior Publication Data

US 2014/0160734 A1    Jun. 12, 2014

(30) Foreign Application Priority Data

Dec. 10, 2012  (CN) .................. 10 1 146478

(51) Int. Cl.
*G02F 1/1335*  (2006.01)

(52) U.S. Cl.
CPC .................. *G02F 1/133603* (2013.01); *G02F 2001/133607* (2013.01)

(58) Field of Classification Search
CPC ............... G02F 1/133603; G02F 2001/133607
USPC ................................. 362/97.1–97.4
See application file for complete search history.

(56) References Cited

U.S. PATENT DOCUMENTS 8,308,314 B2 * 11/2012 Goto ............................ 362/97.3
2007/0091615 A1 * 4/2007 Hsieh et al. ................. 362/335

* cited by examiner

*Primary Examiner* — Jason Moon Han
*Assistant Examiner* — Danielle Allen
(74) *Attorney, Agent, or Firm* — Zhigang Ma

(57) ABSTRACT

An LCD module includes a screen, a light diffusion plate, a first lens, a second lens and an LED. The second lens covers the first lens which in turn covers the LED. The first lens has a first fly-eye lens array formed on a light-incident face thereof and a second fly-eye lens array formed on a light-emergent face thereof. Each of the first fly-eye lens array and the second fly-eye lens array includes multiple convex micro-lenses. The second lens is a light diffusion lens. Light emitted from the LED is diffused by the first lens and the second lens to uniformly illuminate the screen through the light diffusion plate.

18 Claims, 6 Drawing Sheets

LED UNIT AND DISPLAY INCOPORATING THE SAME

BACKGROUND

1. Technical Field

The disclosure generally relates to an LED (light emitting diode) unit, and more particularly, to an LED unit used in a display such as a liquid crystal display (LCD).

2. Description of Related Art

Nowadays LEDs (light emitting diodes) are applied widely in displays for illuminating the screens thereof. A type of display, generally called direct-backlight display, uses a plurality of LEDs which is located behind the screen thereof to directly illuminate the screen. In order to obtain a uniform illumination for the screen, a diffusion plate is often placed between the screen and the LEDs. However, the diffusion plate must be kept a sufficient distance from the LEDs, to thereby ensure that the light emitted from the LEDs can be evenly diffused by the diffusion plate before entering the screen. Thus, a thickness of the display cannot be thin enough. A way to resolve such problem is to provide a diffusion lens for each LED. Nevertheless, the diffusion capability of the lens is still insufficient such that some hot spots may be formed on the screen even after diffusion of the light by the diffusion lens.

What is needed, therefore, is an LED unit of a direct-backlight display which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
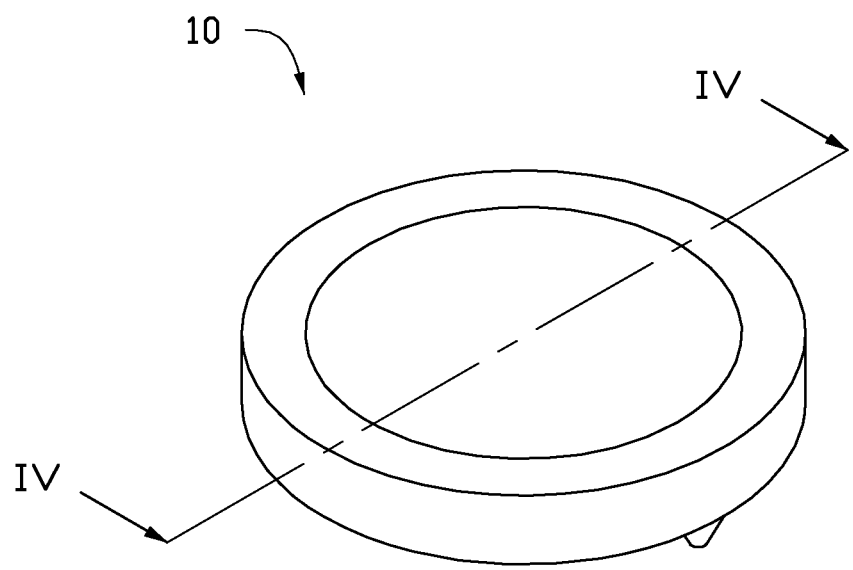
FIG. 1 is an isometric, assembled view of an LED unit in accordance with an embodiment of the present disclosure.
Figure 2:
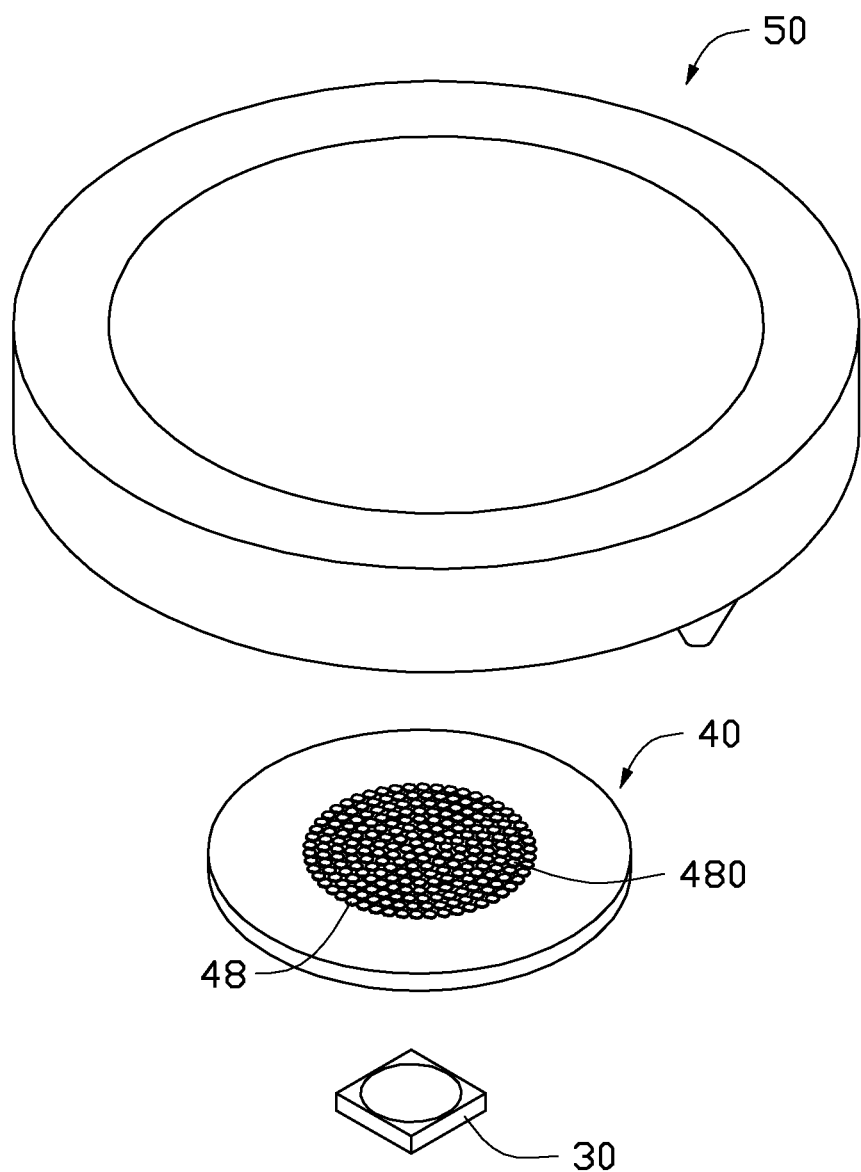
FIG. 2 is an exploded view of the LED unit of FIG. 1.

Referring to FIGS. 1-2, an LED unit 10 in accordance with an embodiment of the present disclosure is shown. The LED unit 10 includes an LED 30, a first lens 40 covering the LED 30 and a second lens 50 covering the first lens 40.

Figure 4:
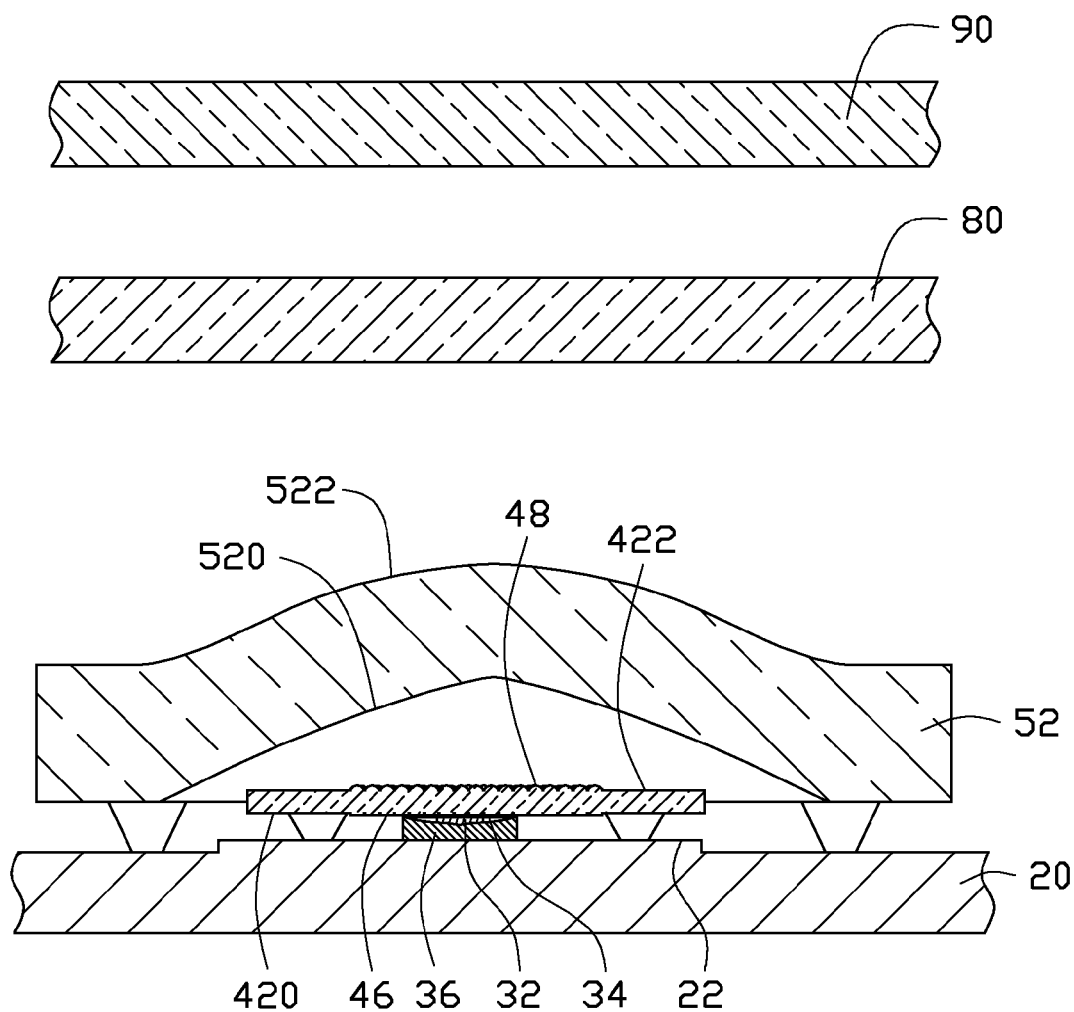
FIG. 4 is a cross section of a direct-backlight display using the LED unit of FIG. 1 taken along line IV-IV thereof, wherein the LED unit is placed on a substrate.

Also referring to FIG. 4, the LED 30 includes a base 36, a light-emitting chip 32 mounted on the base 36 and an encapsulant 34 sealing the chip 32. The base 36 may be made of electrically-insulating and heat-conductive materials such as ceramic. Two leads (not shown) may be further formed on the base 36 for introducing power to the chip 32. The chip 32 may be made of semiconductor materials such as GaN, InGaN, AlInGaN or the like. Preferably, the chip 32 emits blue light when being activated. The encapsulant 34 may be made of transparent materials such as epoxy, silicone, glass or the like. Yellow phosphors (not shown) may be further doped within the encapsulant 34 to change the blue light from the chip 32 to yellow light. Thus, the blue light mixes with the yellow light to produce white light.

The LED 30 is mounted on a substrate 20. In this embodiment, the substrate 20 is a circuit board which electrically connects the two leads of the LED 30. Thus, the power can be transferred to the LED 30 through the substrate 20. The substrate 20 forms a step 22 on a top thereof for supporting the LED 30.

Figure 3:
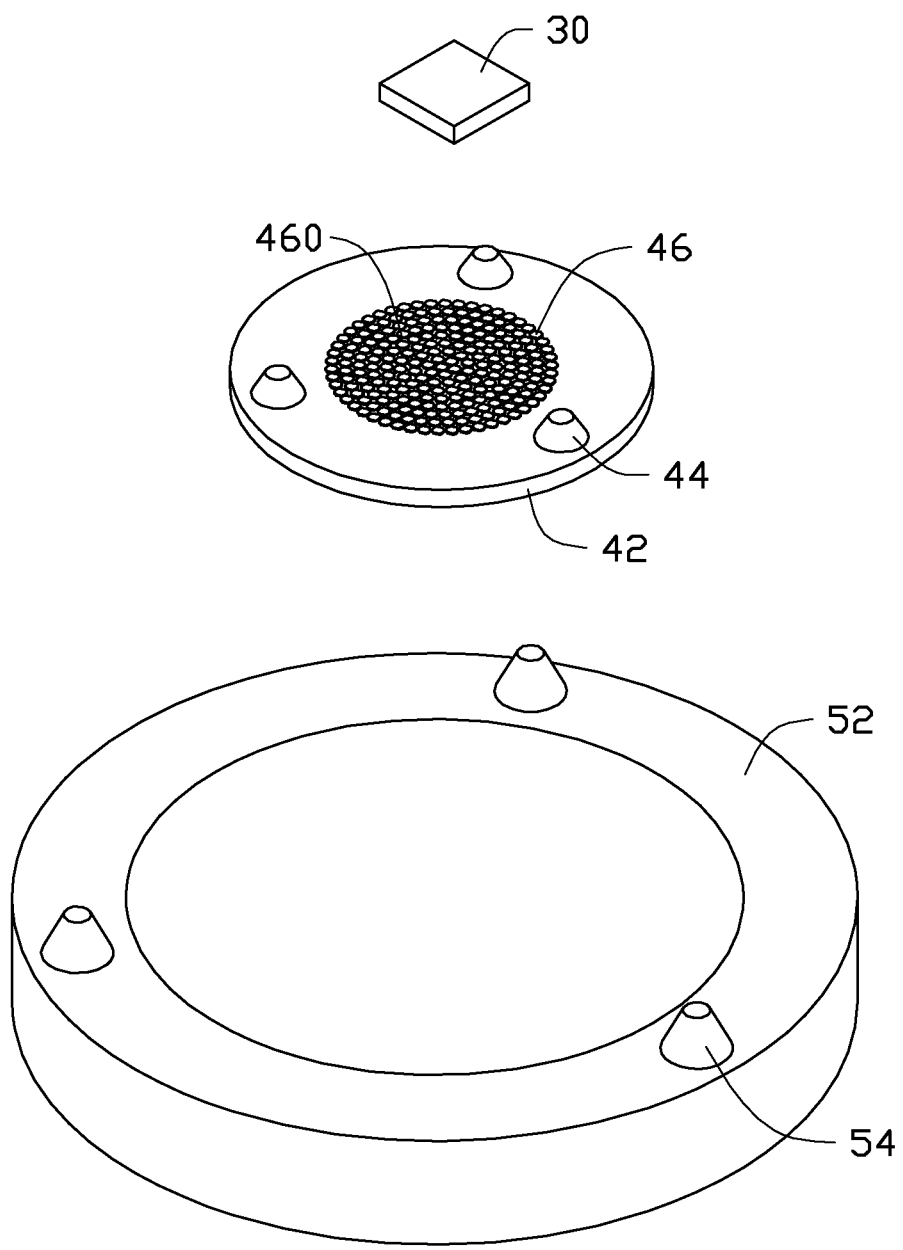
FIG. 3 is an inverted view of the LED unit of FIG. 2.

Also referring to FIG. 3, the first lens 40 includes a main body 42 and three supporting legs 44 extending downwardly from a bottom face of the main body 42. The first lens 40 is integrally made of a monolithic piece of transparent materials such as PC (polycarbonate) or PMMA (polymethylmethacrylate). The main body 42 has a circular shape. The main body 42 includes a light-incident face 420 and a light-emergent face 422 opposite to the light-incident face 420. In this embodiment, both of the light-incident face 420 and the light-emergent face 422 are flat faces parallel to each other. Alternatively, one or both of the light-incident face 420 and the light-emergent face 422 may be a concave face or concave faces.

A first fly-eye lens array 46 is formed on the light-incident face 420, and a second fly-eye lens array 48 is formed on the light-emergent face 422. The first fly-eye lens array 46 includes a plurality of micro-lenses 460 arranged along a plurality of circles concentric about a center of the light-incident face 420 of the first lens 40, and the second fly-eye lens array 48 also includes a plurality of micro-lenses 480 arranged along a plurality of circles concentric about a center of the light-emergent face 422 of the first lens 40. In this embodiment, each micro-lens 460, 480 of the first fly-eye lens array 46 and the second fly-eye lens array 48 is convex, and a curvature of each micro-lens 460 of the first fly-eye lens array 46 is less than that of each micro-lens 480 of the second fly-eye lens array 48. Each micro-lens 460 of the first fly-eye lens array 46 is aligned with a corresponding micro-lens 480 of the second fly-eye lens array 48, wherein a focus of each micro-lens 460 of the first fly-eye lens array 46 is located at an optical axis of the corresponding micro-lens 480 of the second fly-eye lens array 48.

Figure 5:
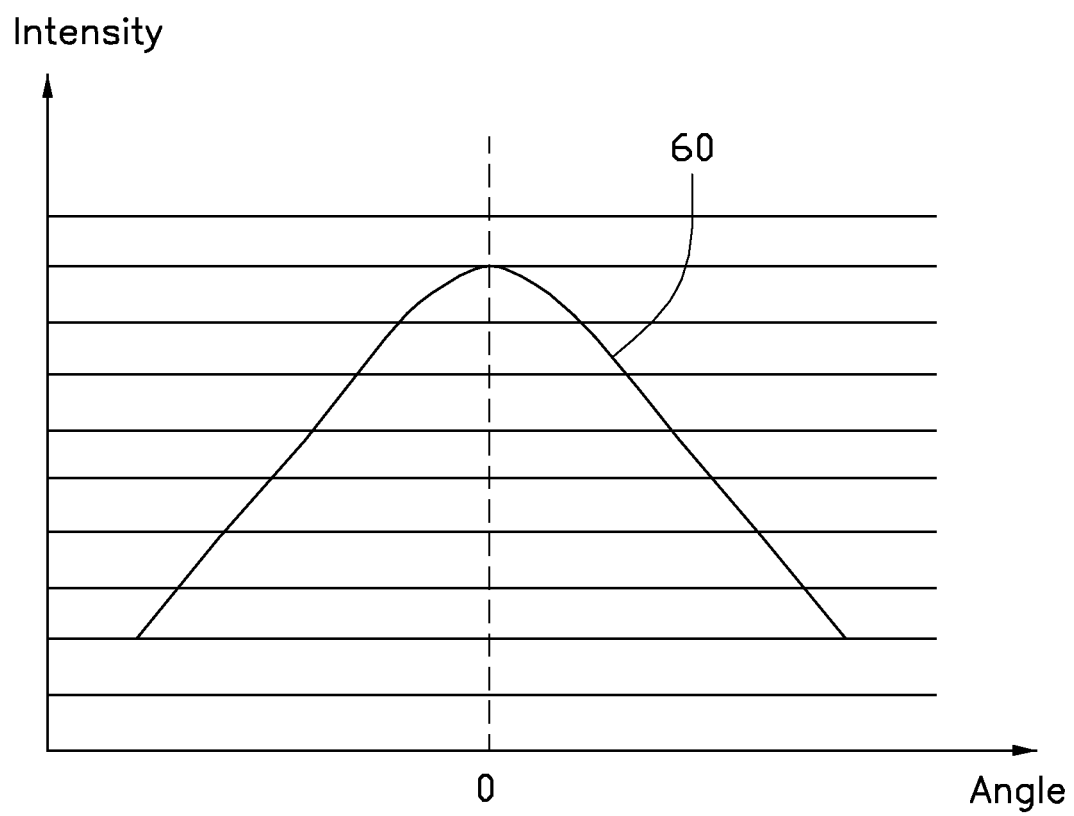
FIG. 5 shows a curve of distribution of light directly emitted from an LED of the LED unit of FIG. 1.
Figure 6:
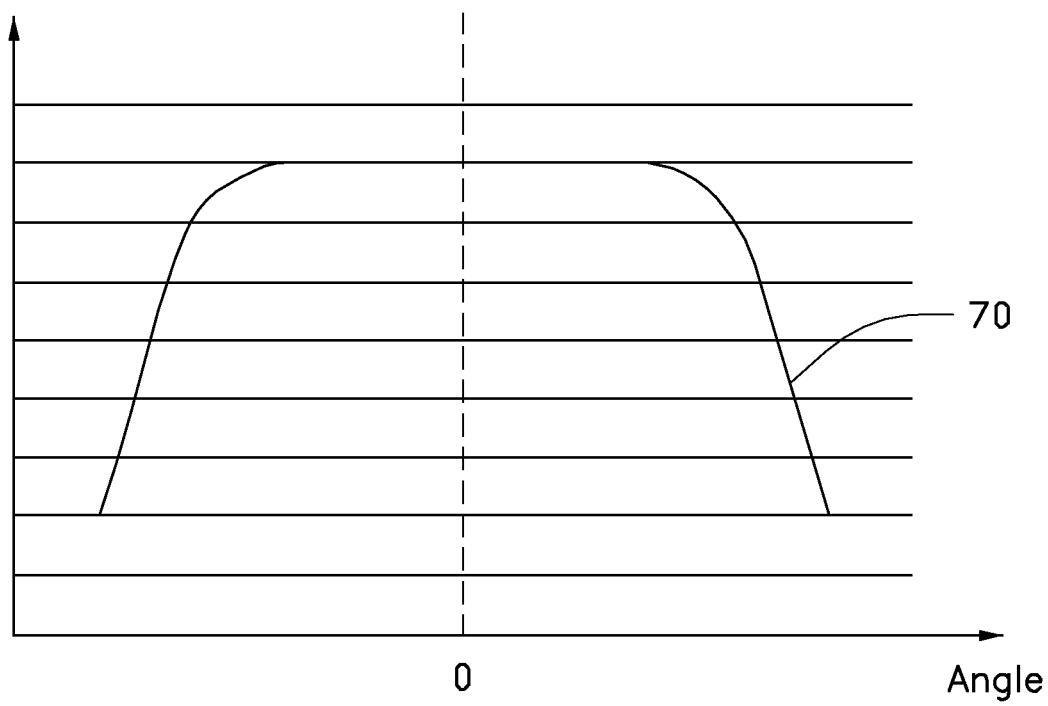
FIG. 6 shows another curve of distribution of light passing through a first lens of the LED unit of FIG. 1.

When the light emitted from the LED 30 enters the first lens 40, the micro-lenses 460 of the first fly-eye lens array 46 firstly converge the light into a plurality of concentrated light beams towards the micro-lenses 480 of the second fly-eye lens array 48. The micro-lenses 480 of the second fly-eye lens array 48 then refract the concentrated light beams to mix and overlap with each other, thereby forming a uniform light beam emergent from the first lens 40. FIG. 5 shows a light distribution curve 60 of the light directly emergent from the LED 30, and FIG. 6 shows a light distribution curve 70 of the light after passing through the first lens 40. As shown in FIG. 5, before being adjusted by the first lens 40, the light emitted from the LED 30 has a central small part with a high intensity. For example, the light with 90% $I_{max}$~100% $I_{max}$ (note: the max intensity of the light at an optical axis of the LED 30 is defined as $I_{max}$) is distributed within a light emergent angle deviated at ±10 degrees relative to the optical axis of the LED 30. After being adjusted by the first lens 30, the light emergent angle of the light with 90% $I_{max}$~100% $I_{max}$ is broaden to ±30 degrees relative to the optical axis of the LED 30. Therefore, the light emitted from the LED 30 is adjusted by the first lens 40 to have a uniform intensity. Alternatively, only one of the first fly-eye lens array 46 and the second fly-eye lens array

48 may be incorporated to the first lens 40, without significantly affecting light-adjusting capability of the first lens 40.

The three supporting legs 44 are disposed on the step 22 of the substrate 20 so that the main body 42 of the first lens 40 is supported over the LED 30.

The second lens 50 also includes a main body 52 and three legs 54 extending from the main body 52 downwardly. The second lens 50 is also integrally made of a monolithic piece of transparent materials such as PC (polycarbonate) or PMMA (polymethylmethacrylate). The main body 52 has a light-emergent face 522 formed at a top face thereof, and a light-incident face 520 formed at a bottom face thereof. In this embodiment, the light-incident face 520 is concave, and the light-emergent face 522 is convex. A curvature of the light-incident face 520 is larger than that of the light-emergent face 522. The three legs 54 are disposed on the substrate 20 to support the main body 52 over the first lens 40. The second lens 50 can further diffuse the light emergent from the first lens 40 to be more uniform.

The LED unit 10 is disposed behind a screen 90 of a display. The screen 90 is a screen for a liquid crystal display (LCD) module. In practice, there is a plurality of LED units 10 behind the screen 90, and the screen 90 has an area far larger than that of the LED unit 10. The light emitted from the LED 30 is diffused by the first lens 40 and the second lens 50 to a uniform light beam on a diffusion plate 80 which further diffuses the light beam into a uniform light to uniformly illuminate the screen 90. Thus, the screen 90 can have a uniform illumination without significant hot spots appearing thereon. Since the first lens 40 and the second lens 50 have sufficient light-diffusion capability, the LED 30 is not required to be placed from the light diffusion plate 80 with a large distance, whereby a thickness of the display incorporating the LED unit 10 can be controlled thin enough. In addition, the required number of the LEDs 30 of the display can be lowered thereby to reduce the cost of the display.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED (light emitting diode) unit for illuminating a screen of an LCD module via a diffusion plate, comprising:
   an LED;
   a first lens covering the LED, the first lens comprising a light-incident face facing the LED and a light-emergent face opposite to the light-incident face and configured for facing the diffusion plate, a first fly-eye lens array formed on the light-incident face, the first fly-eye lens array comprising a plurality of convex micro-lenses to refract light emitted from the LED to mix and overlap, thereby obtaining light with uniform intensity; and
   a substrate, wherein the LED is mounted on the substrate, the first lens further comprises a plurality of legs extending from the light-incident face in a direction away from the light-emergent face, and the legs of the first lens are disposed on the substrate.

2. The LED unit of claim 1, wherein a second fly-eye lens array formed on the light-emergent face, the second fly-eye lens array comprising a plurality of convex micro-lenses each aligned with a corresponding micro-lens of the first fly-eye lens array.

3. The LED unit of claim 2, wherein a curvature of each micro-lens of the first fly-eye lens array is less than that of each micro-lens of the second fly-eye lens array.

4. The LED unit of claim 2, wherein a focus of each micro-lens of the first fly-eye lens array is located at an optical axis of the corresponding micro-lens of the second fly-eye lens array.

5. The LED unit of claim 1, wherein the light-incident face and the light-emergent face of the first lens are flat faces parallel to each other.

6. The LED unit of claim 1, wherein the first fly-eye lens array is surrounded by the legs.

7. The LED unit of claim 1, further comprising a second lens covering the first lens, wherein the second lens comprises a main body and a plurality of legs downwardly extending from the main body, the legs of the second lens are disposed on the substrate to support the main body over the first lens.

8. The LED unit of claim 7, wherein the main body has a concave light-incident face facing the first lens and a convex light-emergent face configured for facing the diffusion plate, the main body defines a cavity, and the light-emergent face of the first lens is received in the cavity and aligned with the light-incident face of the main body.

9. The LED unit of claim 8, wherein a curvature of the light-incident face of the second lens is larger than that of the light-emergent face of the second lens.

10. The LED unit of claim 1, wherein the micro-lenses of the first fly-eye lens array are arranged along a plurality of circles concentric about a center of the main body of the first lens.

11. The LED unit of claim 1, wherein the LED includes a base, a light-emitting chip mounted on the base and facing the light-incident face of the first lens, and an encapsulant sealing the chip.

12. An LCD module comprising:
    a screen;
    a diffusion plate located behind the screen;
    an LED (light emitting diode) module;
    a first lens placed between the LED module and the diffusion plate; and
    a substrate, and the LED mounted on the substrate,
    wherein the first lens comprises a light-incident face facing the LED module and a light-emergent face opposite to the light-incident face and facing the diffusion plate, the first lens further comprises a plurality of legs extending from the light-incident face in a direction away from the light-emergent face, and the legs of the first lens are disposed on the substrate; and
    wherein a first fly-eye lens array is formed on the light-incident face, and a second fly-eye lens array is formed on the light-emergent face, each of the first fly-eye lens array and the second fly-eye lens array comprising a plurality of convex micro-lenses, light generated by the LED module and emitting to the first lens, being diffused by the first fly-eye lens array and the second fly-eye lens array to a light beam having a uniform intensity onto the diffusion plate.

13. The LCD module of claim 12, wherein each micro-lens of the first fly-eye lens array is aligned with a corresponding micro-lens of the second fly-eye lens array, and a focus of each micro-lens of the first fly-eye lens array is located at an optical axis of the corresponding micro-lens of the second fly-eye lens array.

14. The LCD module of claim 12, wherein each micro-lens of the first fly-eye lens array has a curvature less than that of each micro-lens of the second fly-eye lens array.

15. The LCD module of claim 12, further comprising a second lens covering the first lens, wherein the second lens comprises a main body and a plurality of legs downwardly extending from the main body, the legs of the second lens are disposed on the substrate to support the main body over the first lens.

16. The LCD module of claim 15, wherein the main body has a concave light-incident face facing the first lens and a convex light-emergent face configured for facing the diffusion plate, the main body defines a cavity, and the light-emergent face of the first lens is received in the cavity and aligned with the light-incident face of the main body.

17. The LCD module of claim 16, wherein a curvature of the light-incident face of the second lens is larger than that of the light-emergent face of the second lens.

18. The LCD module of claim 12, wherein the LED includes a base mounted on the substrate, a light-emitting chip mounted on the base and facing the light-incident face of the first lens, and an encapsulant sealing the chip.

\* \* \* \* \*